(12) United States Patent
Umesako

(10) Patent No.: US 7,792,417 B2
(45) Date of Patent: Sep. 7, 2010

(54) DATA PROCESSOR

(75) Inventor: Minoru Umesako, Hyogo (JP)

(73) Assignee: Panasonic Corporation, Osaka (JP)

( * ) Notice: Subject to any disclaimer, the term of this patent is extended or adjusted under 35 U.S.C. 154(b) by 996 days.

(21) Appl. No.: 10/599,973

(22) PCT Filed: Apr. 14, 2005

(86) PCT No.: PCT/JP2005/007251

§ 371 (c)(1),
(2), (4) Date: Oct. 16, 2006

(87) PCT Pub. No.: WO2005/104543

PCT Pub. Date: Nov. 3, 2005

(65) Prior Publication Data

US 2008/0008454 A1   Jan. 10, 2008

(30) Foreign Application Priority Data

Apr. 20, 2004   (JP) .............................. 2004-123758

(51) Int. Cl.
*H04N 5/00* (2006.01)
(52) U.S. Cl. ...................... 386/125; 386/126
(58) Field of Classification Search .................. 386/37, 386/45–46, 95–96, 123–126, 131
See application file for complete search history.

(56) References Cited

U.S. PATENT DOCUMENTS

| | | | | |
|---|---|---|---|---|
| 5,371,551 A | * | 12/1994 | Logan et al. | 348/571 |
| 5,510,902 A | * | 4/1996 | Fujinami et al. | 386/123 |
| 7,333,722 B2 | * | 2/2008 | Kushibe et al. | 386/126 |

| | | | |
|---|---|---|---|
| 2004/0136696 A1 | | 7/2004 | Shiokawa et al. |

FOREIGN PATENT DOCUMENTS

| | | |
|---|---|---|
| JP | 2000-138896 | 5/2000 |
| JP | 2002-118825 | 4/2002 |
| JP | 2002-330401 | 11/2002 |
| JP | 2003-111020 | 4/2003 |
| JP | 2003-111023 | 4/2003 |
| JP | 2004-064166 | 2/2004 |
| JP | 2004-159225 | 6/2004 |

OTHER PUBLICATIONS

International Search Report for corresponding Application No. PCT/JP2005/007251 mailed Aug. 2, 2005.

* cited by examiner

*Primary Examiner*—Thai Tran
*Assistant Examiner*—Nigar Chowdhury
(74) *Attorney, Agent, or Firm*—Renner, Otto, Boisselle & Sklar, LLP

(57) ABSTRACT

In a drive loadable with storage media of different types, a data stream is recorded directly on a given storage medium at a write rate and in a recording format associated with the storage medium.

When loaded with a storage medium on which a data stream representing standard resolution video is recordable and when receiving a data stream representing high resolution video, the data processor converts the high resolution video into the standard resolution video and record it on the storage medium. In this case, since the format of the data stream received is different from that of the data stream recordable on the storage medium, a data stream in a format compatible with the storage medium is generated. On the other hand, when loaded with a storage medium on which a data stream representing high resolution video is recordable, the data stream is recorded on the storage medium as it is without converting its resolution or format.

6 Claims, 12 Drawing Sheets

FIG.2
(a) V_TSP
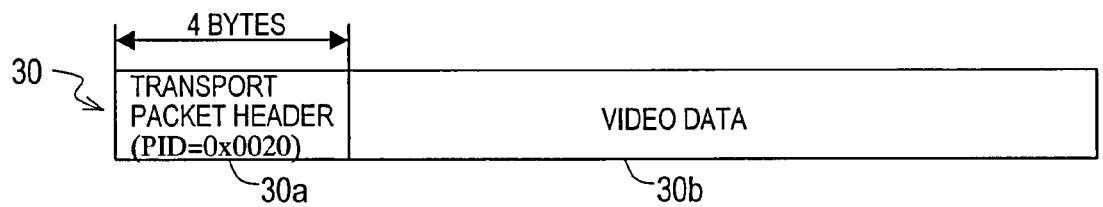
(b) A_TSP
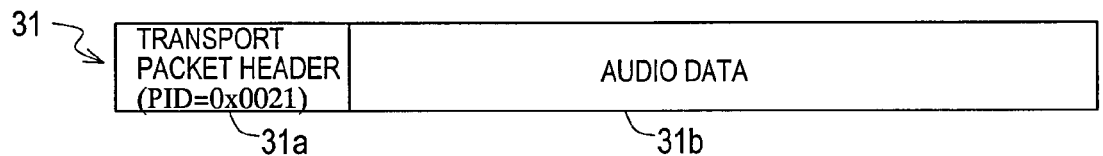

FIG.5
(a)
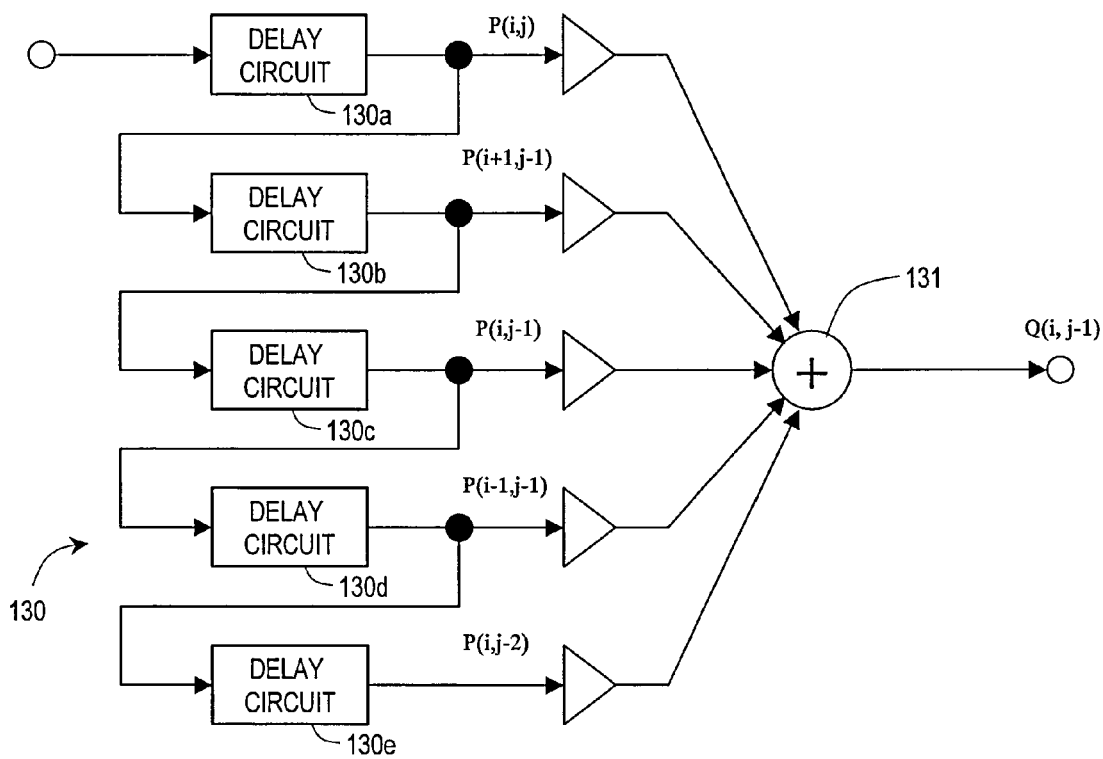
(b)
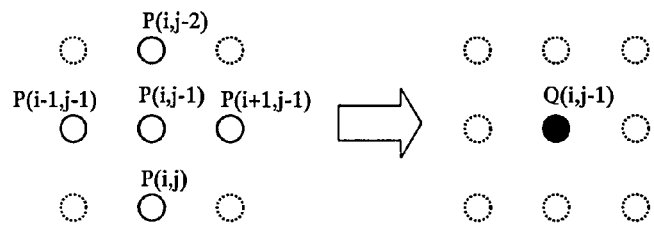

DATA PROCESSOR

TECHNICAL FIELD

The present invention relates to a technique of receiving a data stream such as a digital broadcast and recording the stream on a storage medium that has been inserted into a data processor loadable with a number of different types of storage media.

BACKGROUND ART

Since digital broadcasting launched, people have more and more opportunities to watch and listen to video and audio of higher quality than the video and audio of conventional analog broadcasting. For example, the video of a conventional analog broadcast is presented by interlaced scanning using 525 scan lines, and is called "standard resolution video" or "standard definition (SD) video". Meanwhile, the video of a digital broadcast is presented by either a similar interlaced scanning technique that uses 1,125 scan lines or a progressive scanning technique that uses 525 scan lines, and its quality is higher than that of the SD video. That is why the video of a digital broadcast is called "high resolution video", "high quality video" or "high definition (HD) video". In this description, the video to be presented either by using the greater number of scan lines than the SD video or by the progressive scanning technique will be referred to herein as "HD video".

Recently, HD video recorders have become increasingly popular among consumers. To record HD video without lowering its quality, a storage medium that can store the HD video as digital data while maintaining a required data transfer rate for reading and writing the HD video is needed. Patent Document No. 1 discloses a recorder/player for recording and playing HD video by using a hard disk as such a storage medium. This recorder/player also has the function of writing data on a normal optical disk, on which only SD video data can be stored, and can dub the video on the hard disk onto such an optical disk.

Patent Document No. 1: Japanese Patent Application Laid-Open Publication No. 2002-330401

DISCLOSURE OF INVENTION

Problems to be Solved by the Invention

This recorder/player writes HD video data by the data transfer rate and storage capacity of its unremovable hard disk and is not supposed to adopt a processing mode not using the hard disk when receiving the HD video data. If the user wants to store the contents of the HD video on a normal optical disk, then he or she must record the HD video on the hard disk once, get it converted into SD video, and then have the SD video dubbed onto the normal optical disk, which forces him or her to wait a long time. This recorder/player is far from coming in handy since the user needs to instruct the dubbing operation after the recording operation is finished.

Thus, an object of the present invention is to have a drive, loadable with a number of different types of storage media, directly record a data stream on a given storage medium at a write rate and in a recording format associated with that storage medium.

Means for Solving the Problems

A data processor according to the present invention is loadable with a first type of storage medium and a second type of storage medium and records a data stream on a storage medium loaded. A data stream representing video of standard resolution is recordable in a first format on the first type of storage medium, while a data stream representing video of either the standard resolution or a resolution higher than the standard resolution is recordable in a second format on the second type of storage medium. The data processor includes: a drive, which is loaded with a storage medium, for recognizing the type of the storage medium loaded; a processing section for receiving a data stream in the second format, for extracting a video data stream from the data stream, and for detecting a resolution of the video; a switch for sending a data stream, resulting from the data stream in the second format, along a first path if the first type of storage medium is loaded and if the video is of the higher resolution, and for sending the data stream in the second format along a second path if the second type of storage medium is loaded and if the video is of the standard resolution; a converting section for converting the resolution of the video of the data stream, received by way of the first path, into the standard resolution; and an encoder for generating a data stream in the first format from the data stream of which the resolution has been converted into the standard resolution. The drive writes the data stream supplied from the encoder and the data stream received by way of the second path on the storage medium loaded.

The data processor may further include an analog signal processing section for receiving an analog signal representing video and for generating a data stream representing video of the standard resolution. The encoder may generate a data stream in the first format from the data stream that has been generated by the analog signal processing section.

The data processor may further include a control section for receiving in advance, and managing, time information about recording start and end times. The control section may instruct the processing section to start and stop receiving the data stream in the second format in accordance with the time information.

The converting section may add resolution information about original resolution before the conversion to the data stream that has been converted into the video of the standard resolution. The encoder may generate the data stream in the first format including the resolution information.

If the second type of storage medium is loaded and if the video has the higher resolution, the switch may send the data stream in the second format along the second path.

If the second type of storage medium is loaded and if the video has the higher resolution, the switch may send a data stream, resulting from the data stream in the second format, along the first path. The encoder may generate the data stream in the second format from the data stream, of which the resolution has been converted into the standard resolution by the converting section.

Effects of the Invention

When loaded with a storage medium on which a data stream representing standard resolution video is recordable and when receiving a data stream representing high resolution video, the data processor of the present invention converts the high resolution video into the standard resolution video and then record it on the storage medium. In this case, since the format of the data stream received is different from that of the data stream recordable on the storage medium, a data stream in a format compatible with the storage medium is generated. On the other hand, when loaded with a storage medium on which a data stream representing high resolution video is recordable, the data processor record the data stream on the storage medium as it is without converting its resolution or format. No matter whether the data stream received represents high resolution video or standard resolution video, the data processor can record the data stream directly on such a storage medium. Accordingly, compared to the situation where data is temporarily stored somewhere, subjected to a predetermined conversion, and then written elsewhere finally, not only the temporary storage space but also the time and trouble of reconversion and rerecording can be saved. As a result, the hardware resources can be used more efficiently and the convenience and handiness can be improved for the users.

Optionally, the data may be temporarily stored and then the reconversion and rerecording processes may be performed such that the recording operation preset by the user is carried out just as he or she wishes even if he or she failed to insert a storage medium.

BRIEF DESCRIPTION OF DRAWINGS

FIG. 2(*a*) shows the data structure of a video TS packet 30, and FIG. 2(*b*) shows the data structure of an audio TS packet 31.

Figure 3:
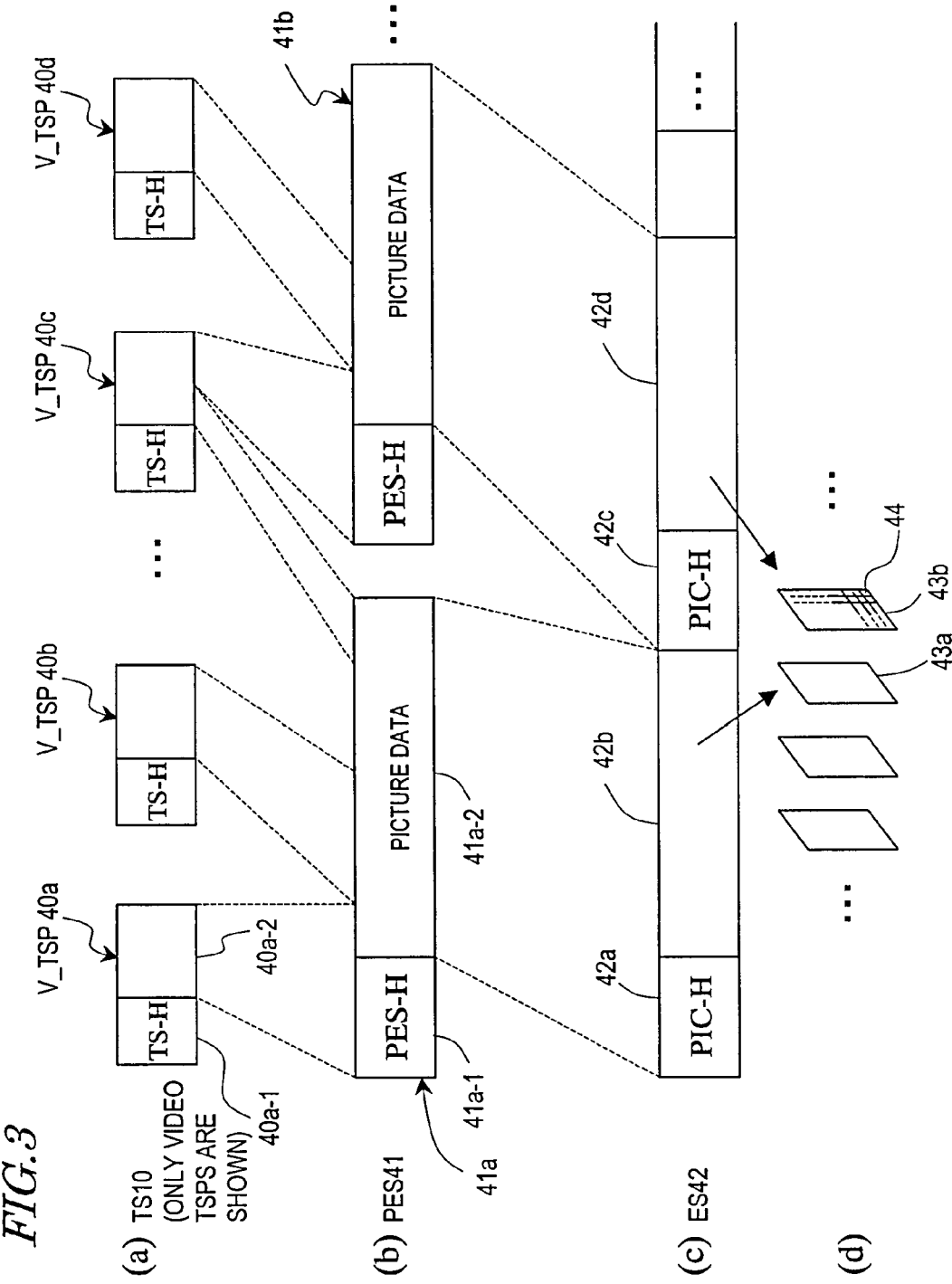

Portions (a) to (d) of FIG. 3 show a correlation between video TS packets and video pictures.

Figure 4:
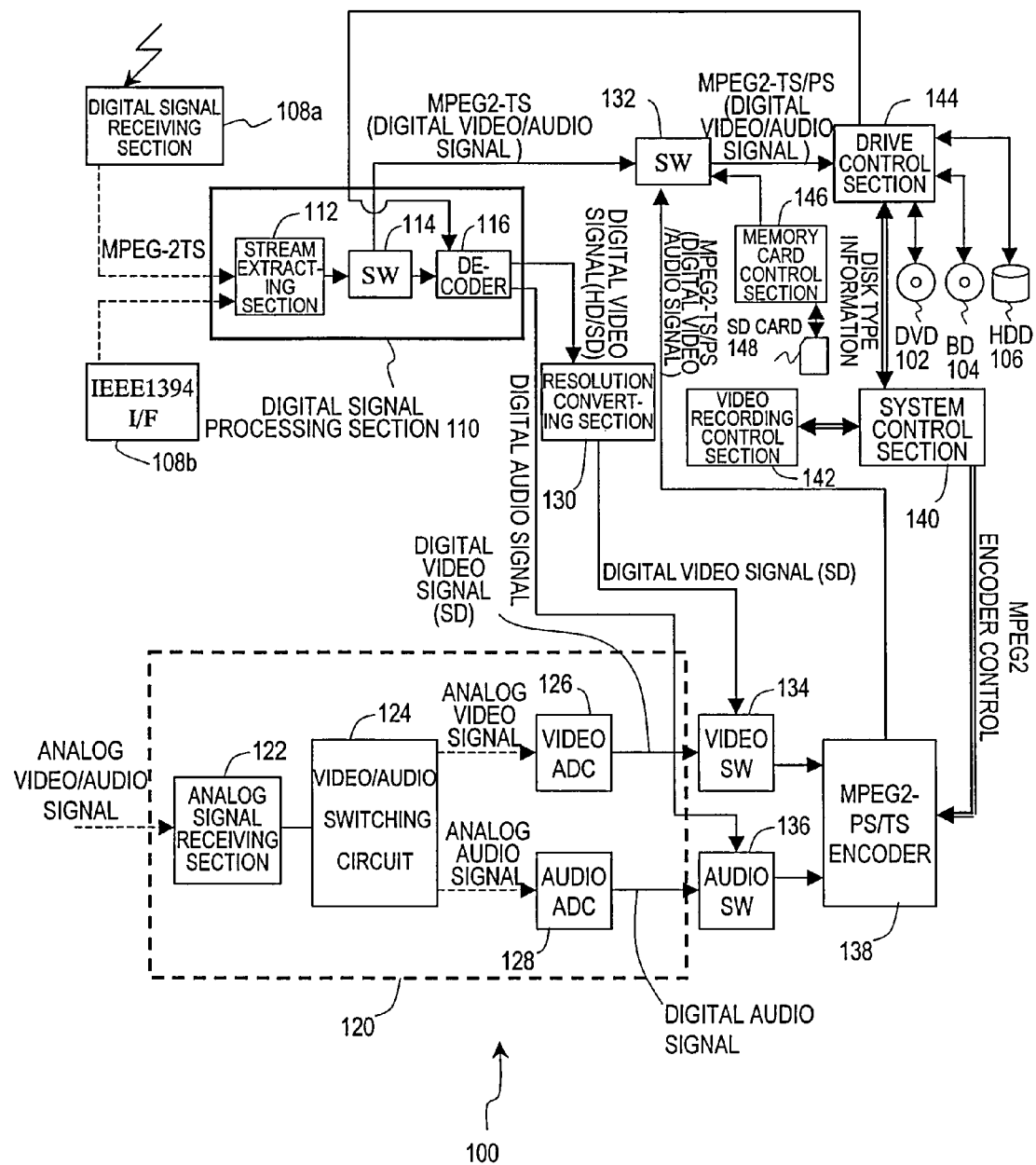

FIG. 4 shows an arrangement of functional blocks in a recorder 100.

FIGS. 5(*a*) and 5(*b*) show the configuration of, and the processing done by, the resolution converting section 130.

Figure 6:
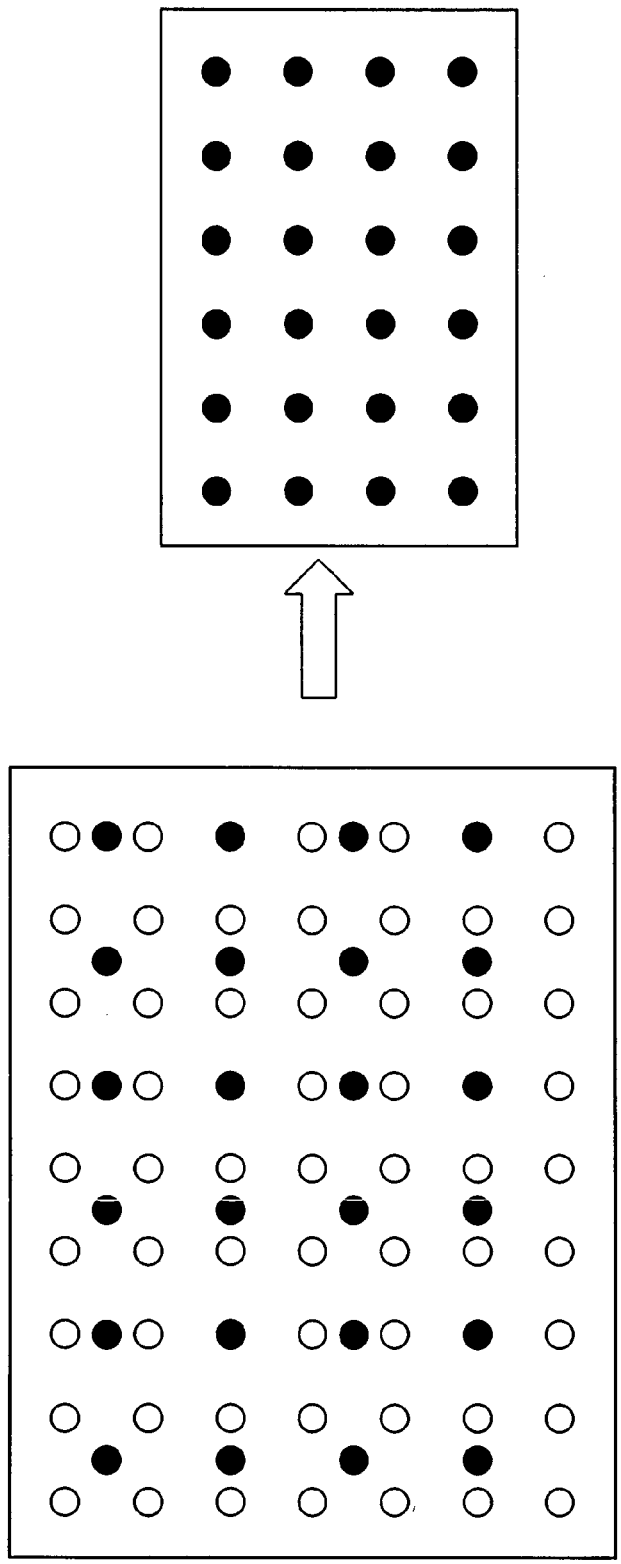

FIG. 6 shows correspondence between pixels of HD video and those of SD video being generated by arbitrarily adjusting the resolution of the HD video.

Figure 7:
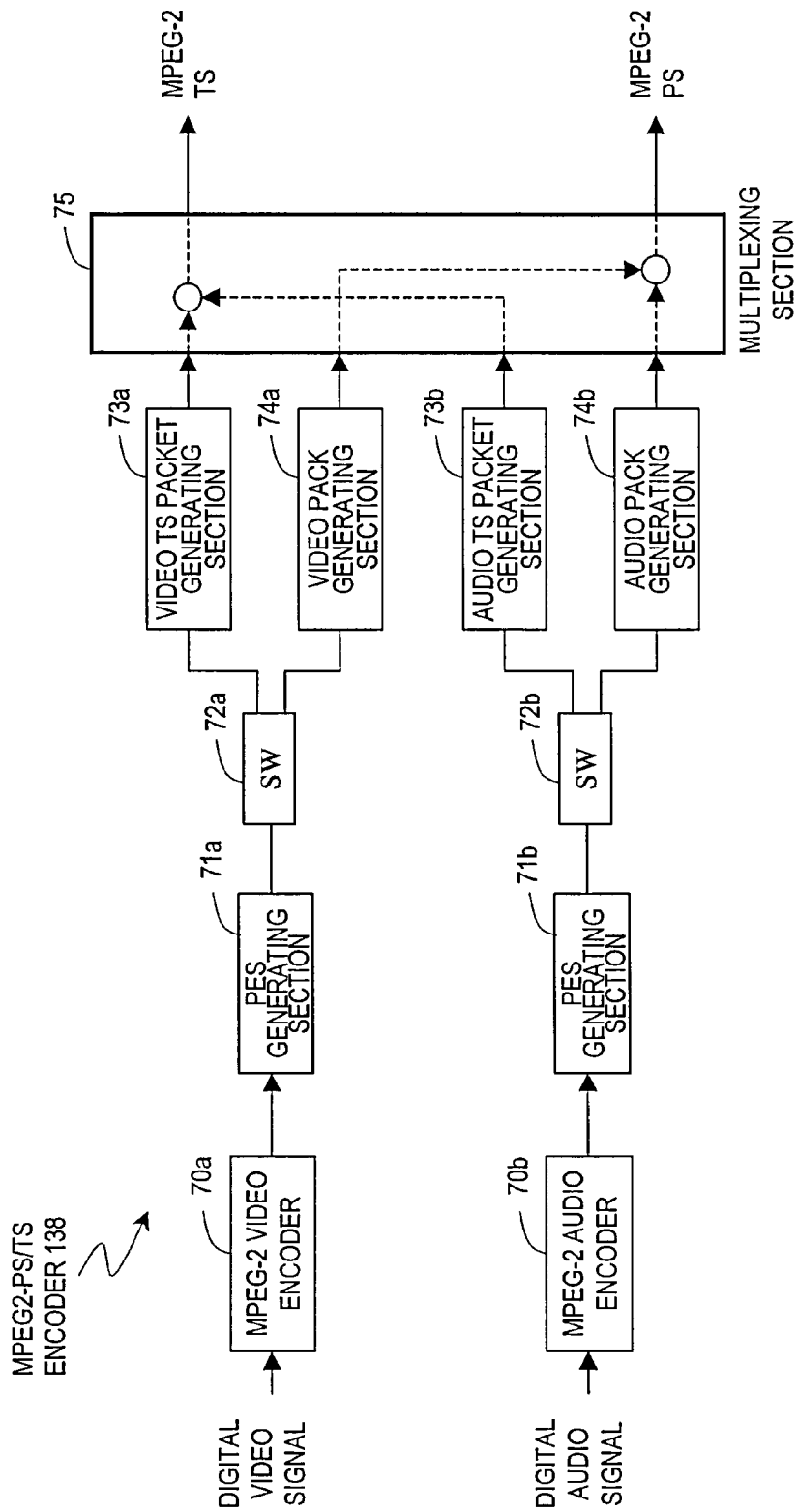

FIG. 7 shows the arrangement of functional blocks in an MPEG2-PS/TS encoder 138.

Figure 8:
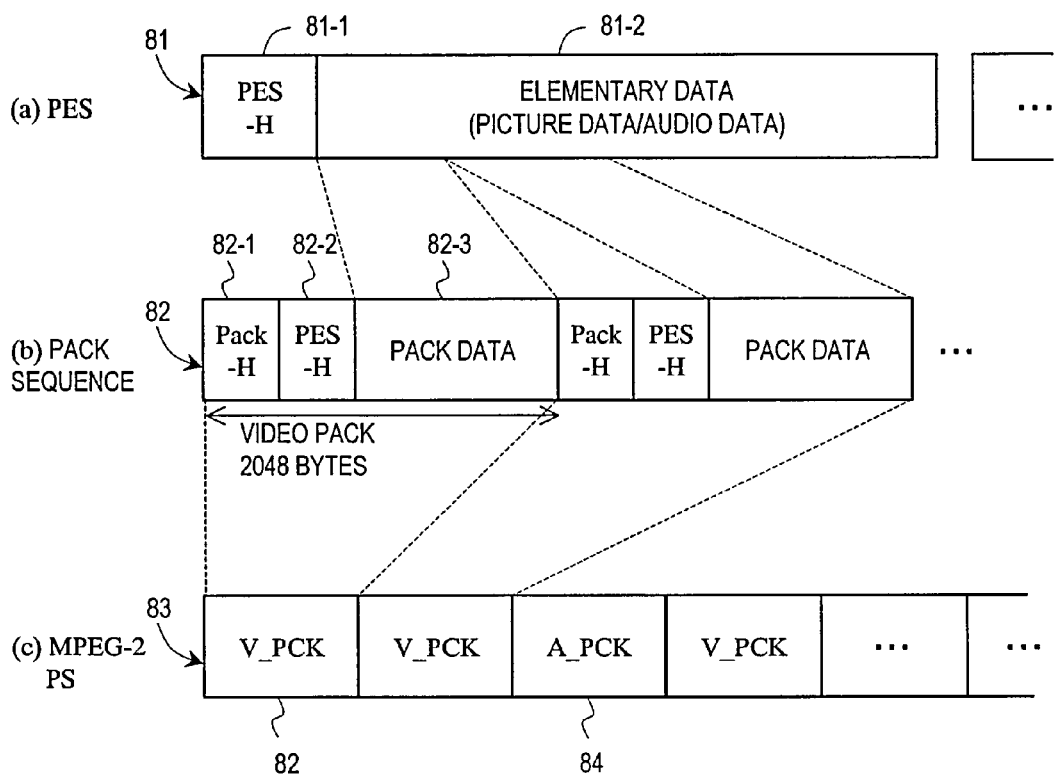

Portions (a) through (c) of FIG. 8 show the data structure of a PS.

Figure 9:
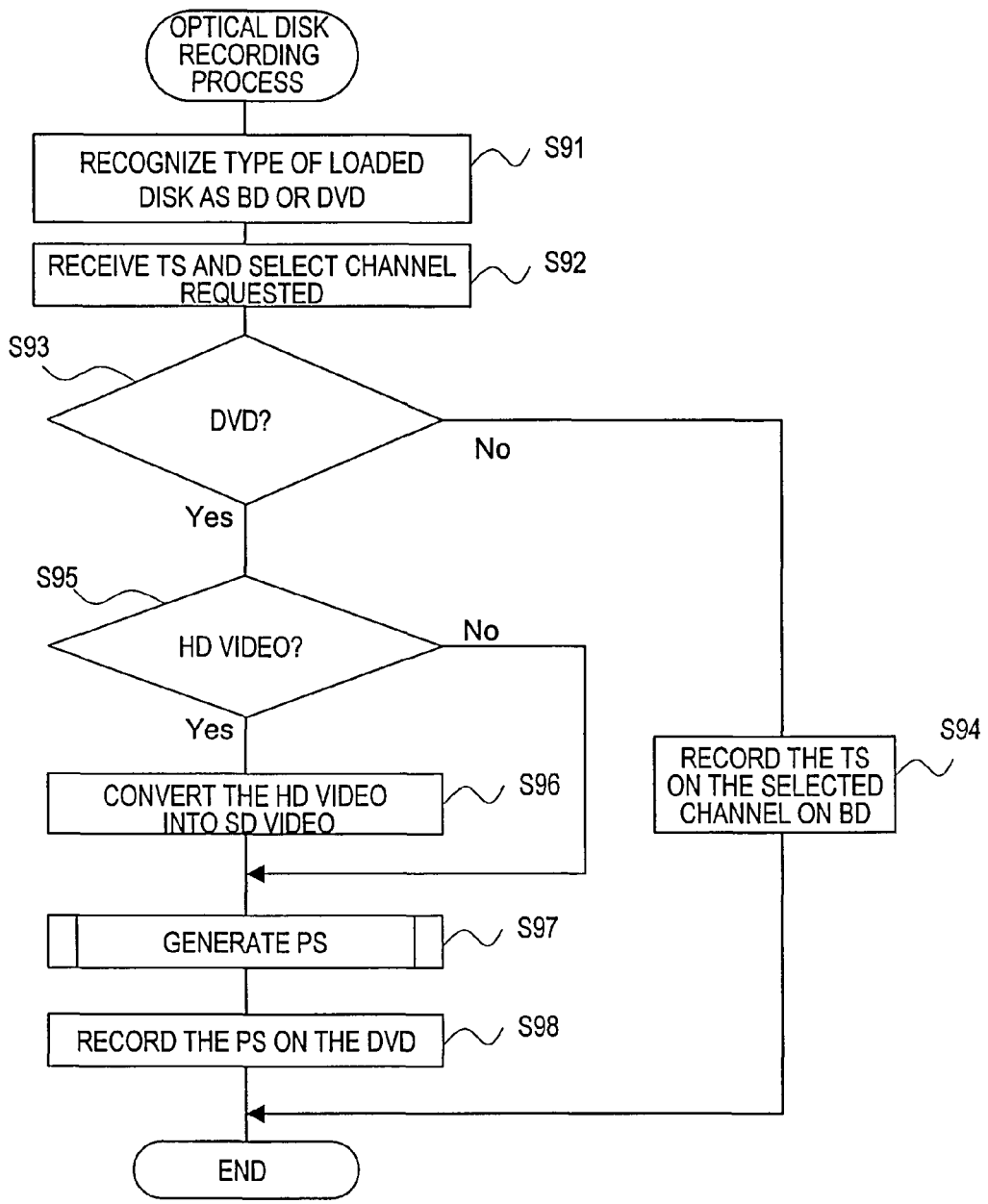

FIG. 9 is a flowchart showing the procedure of processing done by the recorder 100 that is receiving a digital signal.

Figure 10:
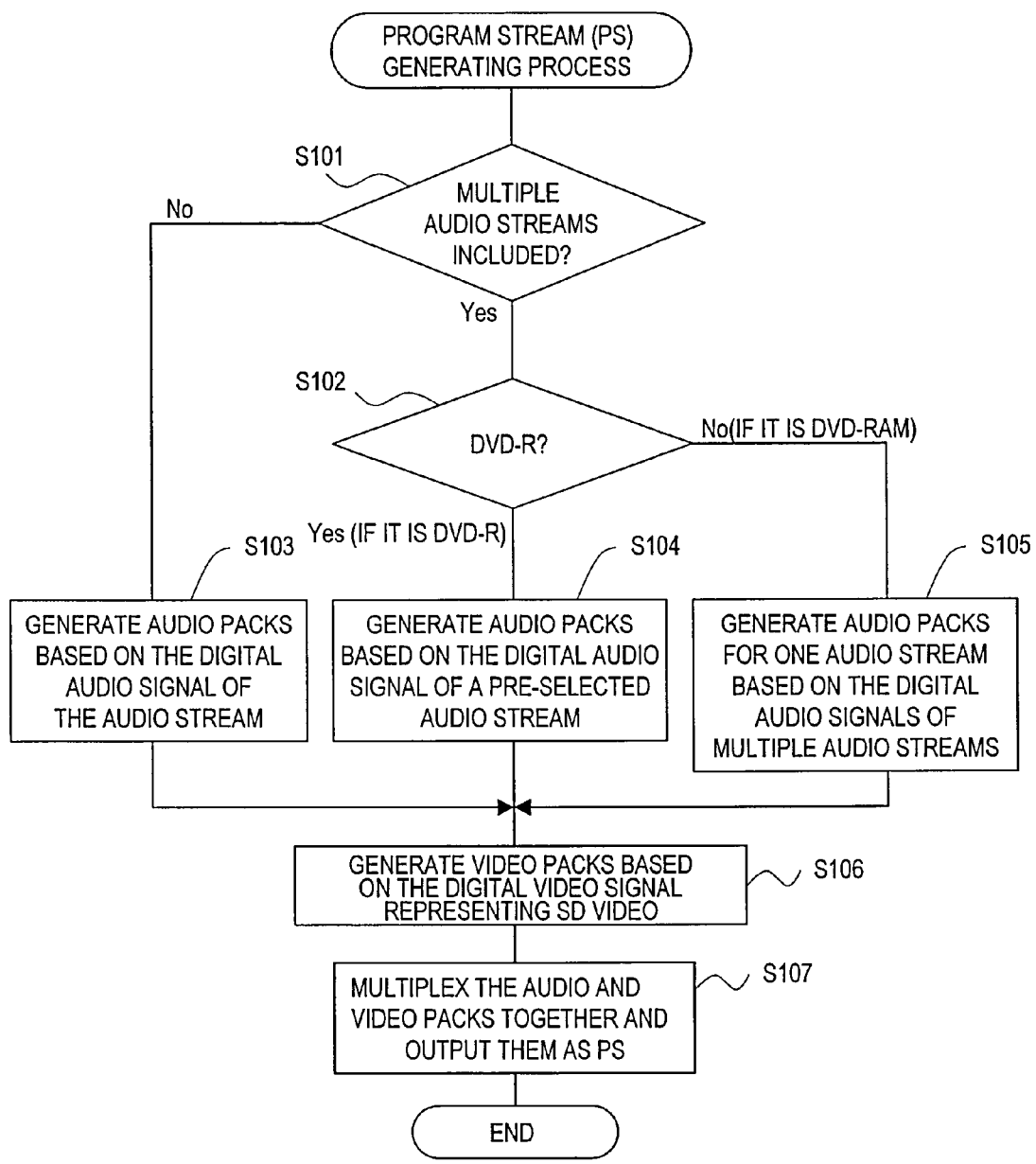

FIG. 10 is a flowchart showing the procedure of PS generating processing done by the recorder 100.

Figure 11:
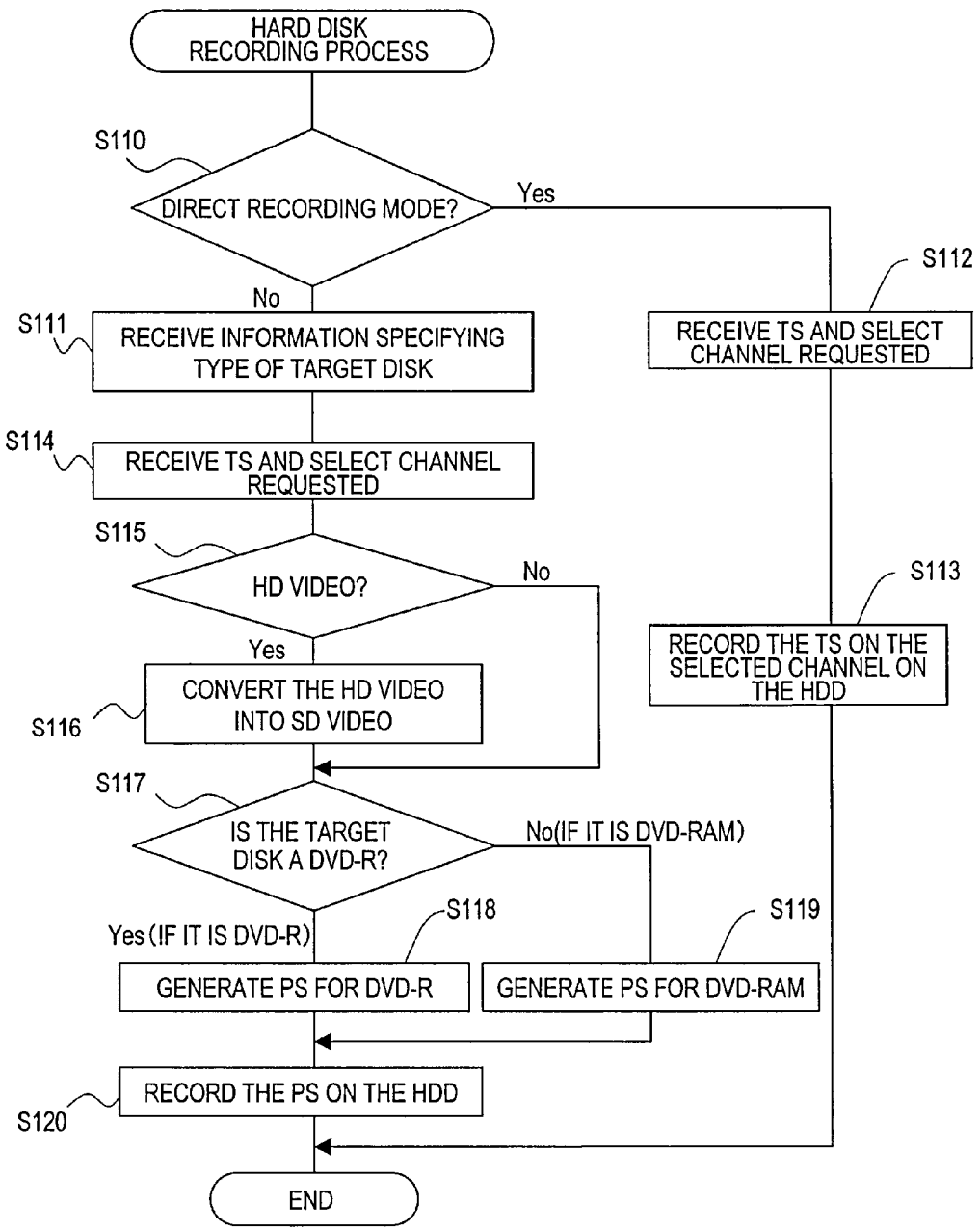

FIG. 11 is a flowchart showing the procedure of recording processing done by the recorder 100.

Figure 12:
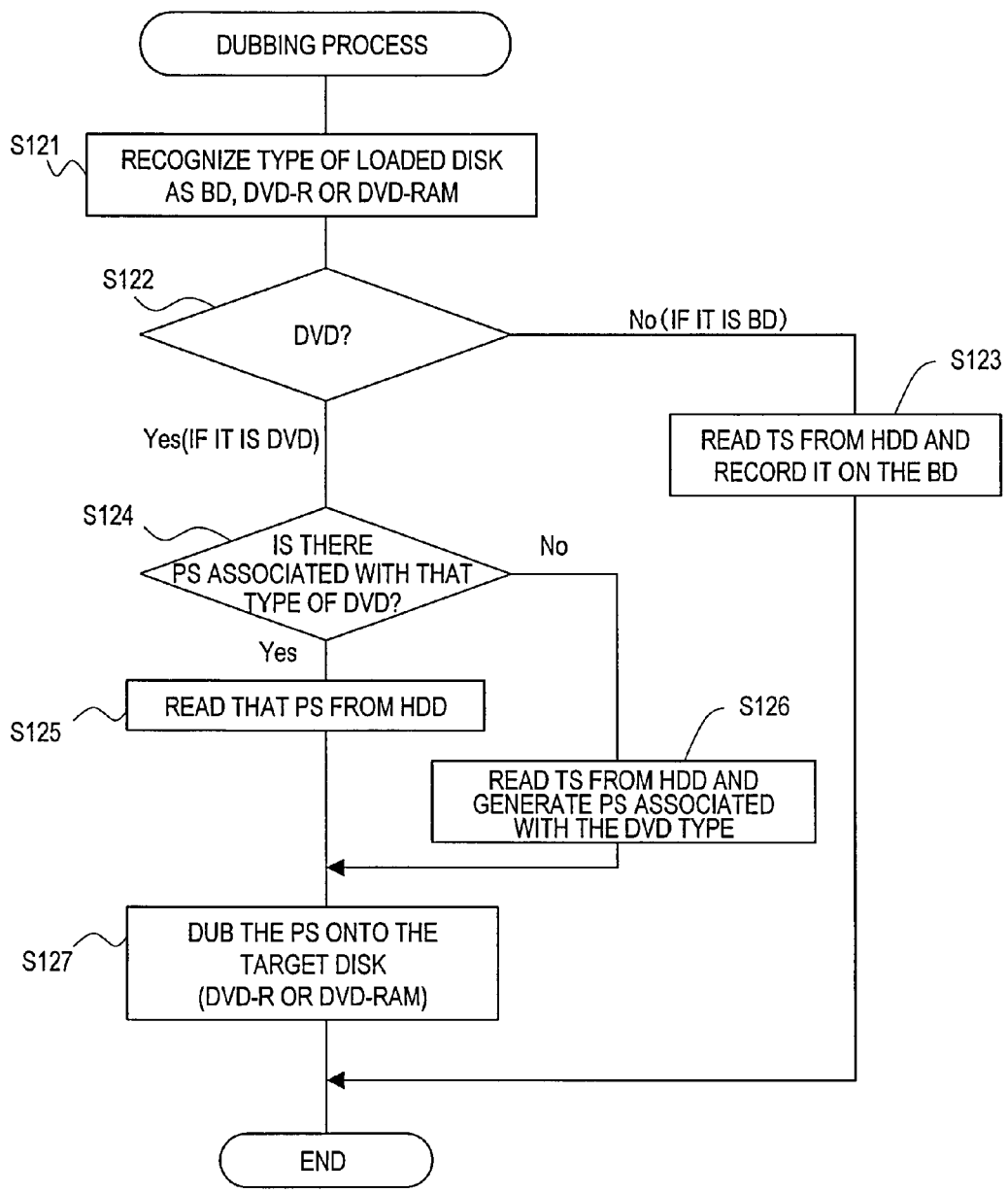

FIG. 12 is a flowchart showing the procedure of dubbing processing done by the recorder 100.

DESCRIPTION OF REFERENCE NUMERALS 100 optical disk recorder
102 DVD
104 BD
106 HDD
108*a* digital signal receiving section
108*b* IEEE 1394 interface
110 digital signal processing section
112 stream extracting section
114, 132, 134, 136 switch
116 decoder
120 analog signal processing section
130 resolution converting section
138 MPEG2-PS/TS encoder
140 system control section
142 video recording control section
144 drive control section
146 memory card control section

BEST MODE FOR CARRYING OUT THE INVENTION

Hereinafter, an optical disk recorder with a hard disk drive will be described as a preferred embodiment of a data processor according to the present invention. The optical disk recorder can receive a data stream representing HD video and/or SD video as digital broadcast and record the data stream on either a removable storage medium inserted or its unremovable storage medium. The storage medium may be a Blu-ray disc (BD), a DVD-R, a DVD-RAM, a hard disk or an SD memory card. This optical disk recorder changes the formats and video resolutions of a data stream to write according to the type of the storage medium on which the data stream is going to be written.

A BD is an optical disk from/on which data is read or written using a violet laser beam with a wavelength of 405 nm. The BD has a storage capacity of about 25 GB per data storage layer and requires a data transfer rate of about 36 megabits per second. On the other hand, a DVD-R and a DVD-RAM are optical disks from/on which data is read or written using a red laser beam with a wavelength of 650 nm. The DVDs have a storage capacity of about 4.7 GB per data storage layer. A DVD-RAM version 2.0 requires a data transfer rate of about 22 megabits per second.

Hereinafter, the data structure of a data stream of a digital broadcast will be described with reference to FIGS. 1 through 3. After that, the configuration and operation of an optical disk recorder that receives the data stream will be described with reference to FIGS. 4 through 9.

Figure 1:
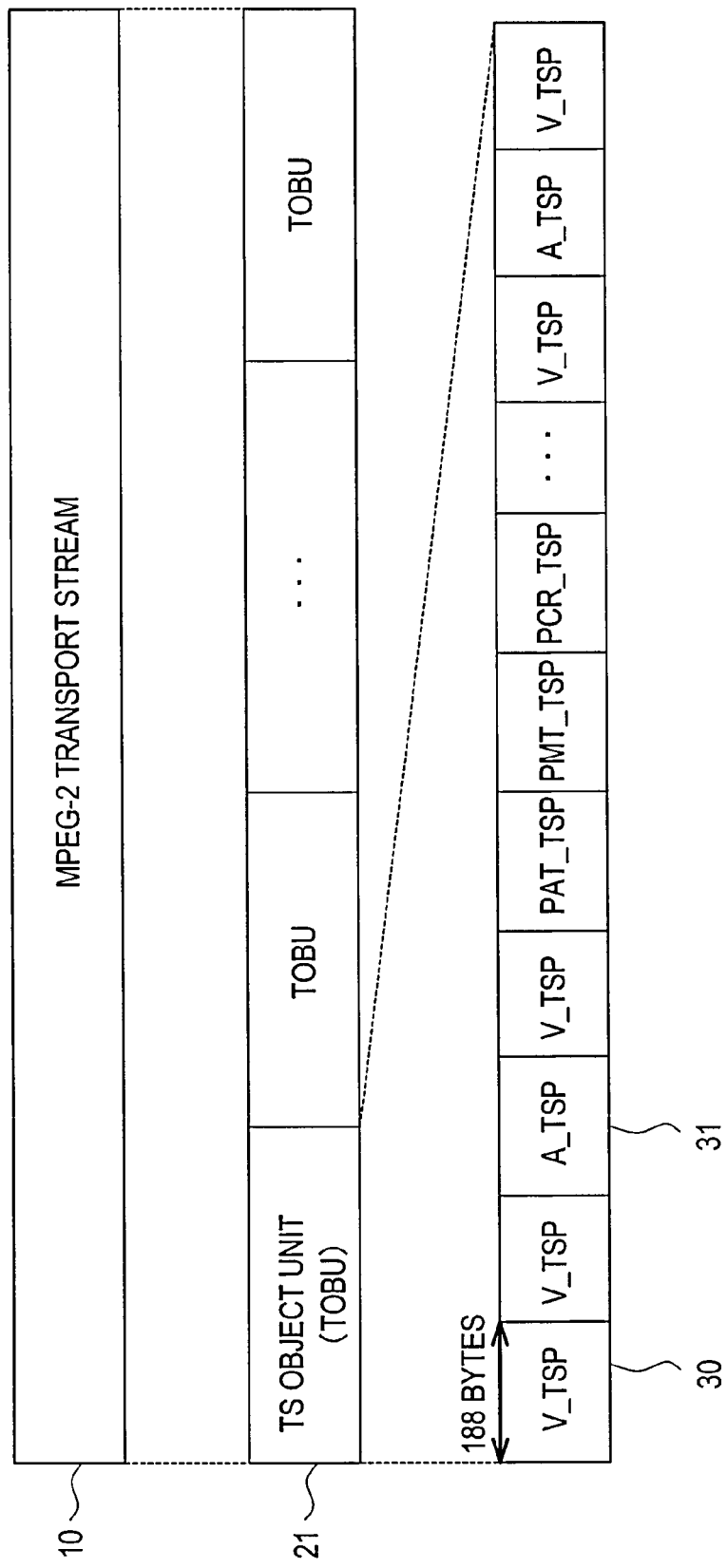
FIG. 1 shows the data structure of an MPEG-2 transport stream 10.

FIG. 1 shows the data structure of an MPEG-2 transport stream 10. The MPEG-2 transport stream 10 (which will be referred to herein as "TS 10") includes a plurality of TS object units (TOBUs) 21, each of which includes at least one transport packet (TS packet). Examples of those TS packets include a video TS packet (V_TSP) 30 in which compressed video data is stored, an audio TS packet (A_TSP) 31 in which compressed audio data is stored, a packet (PAT_TSP) in which a program association table (PAT) is stored, a packet (PMT_TSP) in which a program map table (PMT) is stored, and a packet (PCR_TSP) in which a program clock reference (PCR) is stored. Each of these packets has a data size of 188 bytes.

Hereinafter, the video TS packets and audio TS packets will be described. FIG. 2(*a*) shows the data structure of a video TS packet 30. The video TS packet 30 includes a transport packet header 30*a* of 4 bytes and video data 30*b* of 184 bytes. On the other hand, FIG. 2(*b*) shows the data structure of an audio TS packet 31. The audio TS packet 31 also includes a transport packet header 31*a* of 4 bytes and audio data 31*b* of 184 bytes.

As can be seen from this example, a TS packet usually consists of a transport packet header of 4 bytes and elementary data of 184 bytes. In the packet header, a packet ID (PID) showing the type of that packet is described. For example, the PID of a video TS packet is 0x0020, while that of an audio TS packet is 0x0021. The elementary data may be content data such as video data or audio data or control data for controlling the playback. The type of the data stored there changes according to the type of the packet. It should be noted that the data storage area of a TS packet, following the TS packet header, is called a "payload" when content data such as video data or audio data is stored there and an "adaptation field" when control data is stored there, respectively.

Portions (a) to (d) of FIG. 3 show a correlation between video TS packets and video picture data. As shown in portion (a) of FIG. 3, this TS 10 includes video TS packets 40a through 40d. Although the TS 10 may include other packets, only those video TS packets are shown here. A video TS packet can be easily identifiable by the PID stored in its header 40a-1.

A packetized elementary stream is made up of the video data of respective video TS packets such as the video data 40a-2. Portion (b) of FIG. 3 shows the data structure of a packetized elementary stream (PES) 41. The PES 41 includes a plurality of PES packets 41a, 41b, etc. The PES packet 41a is made up of a PES header 41a-1 and picture data 41a-2. These data are stored as the video data of the video TS packets.

The picture data 41a-2 includes the data of respective pictures. An elementary stream is made up of those picture data 41a-2. Portion (c) of FIG. 3 shows the data structure of an elementary stream (ES) 42. The ES 42 includes multiple pairs of picture headers and frame or field data. It should be noted that although the "picture" is generally used as a term that may refer to either a frame or a field, the "picture" is supposed herein to be a frame.

In the picture header 42a shown in portion (c) of FIG. 3, a picture header code, showing the picture type of the following frame data 42b, is described. In the same way, a picture header code, showing the picture type of the following frame data 42d, is described in the picture header 42c. The "type" is one of an I-picture (I-frame), a P-picture (P-frame) and a B-picture (B-frame). If the type shows this is an I-frame, its picture header code may be "00__00__01__00__20__08", for example.

The frame data 42b, 42d, etc. is data corresponding to a single frame, which may consist of either that data only or that data and preceding/succeeding data to be decoded before and/or after the former data. For example, portion (d) of FIG. 3 shows a picture 43a consisting of the frame data 42b and a picture 43b consisting of the frame data 42d. Each picture is a collection of pixels 44 and the vertical and the numbers of horizontal and vertical pixels are defined according to the resolution.

The TS 10 is recorded on a BD and a hard disk while maintaining the data structure shown in FIG. 1. The data write rate required by the BD and hard disk is higher than the data transfer rate of a data stream representing HD video. Thus, the HD video can be recorded thereon without debasing its quality. SD video may also be recorded on a BD and a hard disk, too.

Meanwhile, the TS 10 cannot be recorded on a DVD. This is because a data stream that can be recorded on a DVD should be formatted as an MPEG2-PS program stream (to be described later) according to the standards. Also, since the data write rate required by the DVD is lower than the data transfer rate of a data stream representing HD video, the HD video cannot be recorded on a DVD without sacrificing its quality.

Hereinafter, the configuration and functions of the optical disk recorder 100 with a hard disk will be described with reference to FIG. 4.

FIG. 4 shows an arrangement of functional blocks in the optical disk recorder 100 with a hard disk (which will be simply referred to herein as the "recorder 100"). The recorder 100 includes a hard disk drive (HDD) 106, a digital signal receiving section 108a, an IEEE 1394 interface 108b, a digital signal processing section 110, an analog signal processing section 120, a resolution converting section 130, switches 132, 134 and 136, an MPEG2-PS/TS encoder 138, a system control section 140, a video recording control section 142, a drive control section 144, and a memory card control section 146. The recorder 100 is loaded with a recordable DVD 102 or a BD 104. The DVD 102 may be a DVD-RAM or a DVD-R, for example. In this preferred embodiment, the same slot is used for inserting the DVD 102 and BD 104. That is to say, the recorder 100 is supposed to be loaded with one of these two types of disks, not both, at a time. The recorder 100 can write data on either the DVD 102 or the BD 104 independently of the HDD 106.

Hereinafter, the functions of the recorder 100 will be outlined. Before recording a digital broadcast received, the recorder 100 recognizes the type of the given optical disk as a DVD 102 or a BD 104. When loaded with the BD 104, the recorder 100 records the TS 10 as it is on the BD 104 no matter whether the video represented by the TS 10 received is HD video or SD video. On the other hand, when loaded with the DVD 102, the recorder 100 needs to convert the TS 10 into a program stream (which will be abbreviated herein as a "PS"). In that case, the recorder 100 determines whether the video represented by the TS 10 being received is HD video or SD video. If the video received is SD video, then the recorder 100 generates a PS without debasing its quality and records the PS on the DVD 102. Meanwhile, if the video received is HD video, then the recorder 100 converts the HD video into SD video and then generates a PS and records it on the DVD 102. By performing these processing steps, the recorder 100 directly records the data stream on the given optical disk at a write rate and in a data format associated with that optical disk. Thus, there is no need to temporarily store the data stream and a broadcast received can finish being recorded on the optical disk the instant the broadcast ends.

It should be noted that the recorder 100 includes the HDD 106 and can store the TS 10 in the HDD 100 instead of the BD 104. In this preferred embodiment, if the recorder 100 is loaded with neither the DVD 102 nor the BD 104, then the TS 10 is stored on the HDD 106 to avoid failing to record a designated program.

Hereinafter, the respective components of the recorder 100 will be described one by one. The TS processing system will be described first, and then the analog signal processing system will be described.

The digital signal receiving section 108a receives a broadcast wave, digitizes its signal waveform, and then outputs the digital signal as a TS 10. The IEEE 1394 interface (I/F) 108b controls the exchange of data between an external connected device (not shown) and the recorder 100 and can acquire the TS 10 from that device, too.

The digital signal processing section 110 receives the TS 10 from the digital signal receiving section 108a, IEEE 1394 I/F 108b and drive control section 144. Also, the digital signal processing section 110 either outputs the TS 10 as it is or decodes the TS 10 and outputs non-compressed digital video signal and digital audio signal according to predetermined conditions.

The digital signal processing section 110 includes a stream extracting section 112, a switch 114 and a decoder 116. The TS 10 may include data streams representing a plurality of programs. In that case, the stream extracting section 112 extracts a data stream representing a particular program in accordance with the instruction of the system control section 140 on the channel selection. More specifically, the stream extracting section 112 extracts the program association table packet (PAT_TSP) and program map table packet (PMT_TSP) shown in FIG. 1, thereby extracting a data stream concerning a content that represents a designated program. Suppose the channel number of the designated program is X. In that case, first, the TS packets are searched for the program association table packet. The packet ID (PID) of the program association table packet may be zero, for example. Thus, a packet having that value may be searched for. In the program association table in the program association table packet, respective channel numbers and the program map table PIDs of respective programs associated with those channel numbers are stored. Thus, the packet ID (PID) of the program map table (PMT) associated with the channel number X can be detected. The PID of the program map table PMT is supposed to be XX.

Next, when the program map table packet with PID=XX is extracted, a program map table associated with the channel number X can be obtained. The program map table PMT includes the PIDs of TS packets, in which the video and audio information of each program to watch and listen to is stored. For example, the PID of the video information associated with the channel number X may be XV and the PID of the audio information thereof may be XA. By using the PID (=XV) of the packet storing the video information and the PID (=XA) of the packet storing the audio information, the video and audio packets about a particular program content can be extracted from a single TS. A data stream made up of those extracted packets is also a TS. Strictly speaking, the TS received is different from the TS consisting of the extracted packets. However, these TS are supposed herein to be identical with each other for convenience sake.

Also, the stream extracting section 112 determines, by the descriptor in the header of the stream, for example, whether the video extracted from the TS is SD video or HD video. The descriptor indicates whether the quality of video is SD or HD. The stream extracting section 112 also outputs resolution information showing the resolution.

The switch 114 switches the transmission paths of the TS in accordance with the disk type information provided by the system control section 140 and the resolution information provided by the stream extracting section 112 as will be described later. More specifically, if the recorder 100 is loaded with the DVD 102 and if the video of the TS is HD video, then the switch 114 outputs the TS to the path to which the decoder 116 is connected. On the other hand, if the recorder 100 is loaded with the BD 104, if the HDD 106 has been selected as the storage of the TS, or if the recorder 100 is loaded with neither the DVD 102 nor the BD 104, then the switch 114 outputs the TS to the path to which a switch 132 is connected. The situation where the recorder 100 is loaded with neither the DVD 102 nor the BD 104 is taken into account in order to make the recorder 100 record the TS on the HDD 106 and thereby avoid missing the program selected due to the failure to insert any disk. For the same reasons, even if the recorder 100 is loaded with the DVD 102 or the BD 104 but if its remaining storage capacity is equal to or less than a predetermined value, then the switch 114 may change the paths so as to output the TS to the path to which the switch 132 is connected.

The decoder 116 receives the TS from either the switch 114 or the drive control section 144 and splits the TS into video and audio packets, thereby acquiring video data and audio data. Then, the decoder 116 decompresses the compressed and encoded video data to generate and output a non-compressed digital video signal (compliant with the REC 656 or 601 standard, for example). At this point in time, the quality of the HD video or SD video does not change. This digital video signal contains digital data on a video frame basis. The decoder 116 also decodes the compressed and encoded audio data, thereby outputting a non-compressed digital audio signal. This digital audio signal contains digital data on an audio frame basis.

The resolution converting section 130 receives the non-compressed digital video signal. If the signal represents HD video, then the resolution converting section 130 converts the HD video into SD video. On the other hand, if the signal represents SD video, then the resolution converting section 130 outputs the SD video as it is. Hereinafter, the process of converting the HD video into the SD video will be described with reference to FIGS. 5(a) and 5(b), which illustrate the configuration of, and the processing done by, the resolution converting section 130. The resolution converting section 130 sequentially receives pixel data, representing the pixel 44 (see FIG. 3(d)) and other pixels, performs predetermined calculations on those pixel data received, and outputs a single pixel data. That is to say, the resolution converting section 130 changes multiple pixels of the HD video into a single pixel of the SD video.

To produce SD video by halving the vertical and horizontal resolutions of the HD video, for example, the calculation may be done in the following manner. Specifically, in that case, the resolution converting section 130 receives the pixel data of respective pixels P (i, j−2), P (i−1, j−1), P (i, j−1), P (i+1, j−1) and P (i, j) of the HD video shown in FIG. 5(b) and gets their transfer delayed by the delay circuits 130a through 130e for a predetermined amount of time. And these pixel data are multiplied by a predetermined filter coefficient when obtained at the same time, and then the products are input to a computation unit 131. In response, the computation unit 131 calculates the weighted average of those products, thereby outputting the pixel data of a pixel Q (i, j−1). In this manner, the HD video can be converted into the SD video. In the example illustrated in FIGS. 5(a) and 5(b), one pixel of the SD video to be output consists of five adjacent pixels. However, the SD video may also be generated from multiple discrete pixels, too. Alternatively, SD video, of which the vertical and horizontal resolutions have been halved from those of the HD video, may also be produced just by adopting every other pixel data of the HD video. In either case, by setting the filter coefficient so as to produce no reflected distortion by a known technique, the resolution can be converted from a certain number of pixels into any desired number of pixels.

FIG. 6 shows correspondence between pixels of HD video and those of SD video being generated by arbitrarily adjusting the resolution of the HD video. By appropriately changing the filter coefficients, the resolution converting section 130 can generate the solid-circle pixels from the pixels of the HD video, indicated by the open circles, and can produce SD video consisting of the solid-circle pixels. The correlation between the filter coefficient value and the output data has been researched extensively. Thus, by consulting those researches, it can be determined easily what filter coefficient should be adopted to output desired data. That is why in this preferred embodiment, a specific method of deriving the filter coefficient will not be described in detail.

The switch 132 makes a signal path such that the TS 10 is transmitted from the digital signal processing section 110 to the drive control section 144. Also, if a data stream (i.e., a TS or a PS) has been output from the MPEG2-PS/TS encoder 138 as will be described later, then the switch 132 forms a signal path such that the data stream will be transmitted to the drive control section 144.

If the incoming signals are digital signals, the switches 134 and 136 switch signal paths such that the digital video signal representing the SD video and supplied from the resolution converting section 130 and the digital audio signal supplied from the digital signal processing section 110 are both transmitted to the encoder 138. On the other hand, if the incoming signals are analog signals, the switches 134 and 136 switch signal paths such that the digital video and audio signals supplied from the analog signal processing section 120 are transmitted to the encoder 138.

The MPEG2-PS/TS encoder 138 (which will be simply referred to herein as the "encoder 138") receives the digital video and audio signals and generates a TS or a PS. FIG. 7 shows an arrangement of functional blocks for the MPEG2-PS/TS encoder 138. The encoder 138 generates a TS when receiving disk type information showing that the given disk is the BD 104 but generates a PS when receiving disk type information showing that the given disk is the DVD 102.

The encoder 138 has two paths for processing the digital video signal and the digital audio signal, respectively. First, it will be described how the encoder 138 processes the TS. The TS generating process corresponds to the process of sequentially making up the ES 42 shown in portion (c) of FIG. 3, the PES 41 shown in portion (b) of FIG. 3 and then the TS 10 of the respective frame data shown in portion (d) of FIG. 3. This is why this process will be described using the reference numerals shown in FIG. 3 when needed.

First, the video encoder 70a shown in FIG. 7 receives a non-compressed digital video signal, which contains data on a frame-by-frame basis. The video encoder 70a subjects that data to a compression and encoding process compliant with the MPEG-2 standard, adds picture headers 42a and 42c thereto, and then outputs the ES 42. A PES generating section 71a receives the ES 42 as picture data and adds PES headers 41a-1, etc., thereby generating PES packets. The PES packets are output as PES 41 one after another. In accordance with the disk type information described above, a switch 72a outputs the PES 41, supplied from the PES generating section 71a, to a video TS packet generating section 73a, which divides the PES 41 and adds a TS packet header 40a-1, etc., thereby generating a video TS packet (V_TSP) of 188 bytes (see FIG. 2(*a*)) and outputting it to a multiplexing section 75.

Meanwhile, the digital audio signal is also processed in a similar manner. Specifically, an audio encoder 70b subjects data contained in the digital audio signal to a compression and encoding process compliant with a predetermined standard, and adds headers thereto, thereby generating an elementary stream. A PES generating section 71b adds PES headers to the elementary stream, thereby generating PES packets on an audio frame basis. The PES packets are output as PES one after another. In accordance with the disk type information described above, a switch 72b outputs the PES, supplied from the PES generating section 71b, to an audio TS packet generating section 73b, which divides the audio PES and adds a TS packet header, thereby generating an audio TS packet (A_TSP) of 188 bytes (see FIG. 2(*b*)) and outputting it to the multiplexing section 75.

The multiplexing section 75 receives the video and audio TS packets and outputs a TS in which respective types of packets are arranged as shown in FIG. 1.

Hereinafter, it will be described with reference to portions (a) through (c) of FIG. 8 (when necessary) how the encoder 138 generates a PS. Portions (a) through (c) of FIG. 8 show the data structure of the PS.

First, the video encoder 70a shown in FIG. 7 receives a non-compressed digital video signal, which contains data on a frame-by-frame basis. The video encoder 70a subjects that frame data to a compression and encoding process compliant with the MPEG-2 standard, thereby generating picture data. Then, the compressed and encoded picture data is sent to the PES generating section 71a.

The PES generating section 71a adds a PES header 81-1 to the picture data, thereby generating a PES packet. Portion (a) of FIG. 8 shows the data structure of the PES packet 81. In the PES packet 81, the PES header 81-1 is followed by the compressed and encoded picture data 81-2. A number of PES packets are sequentially output as PES.

Next, when the disk type information received indicates that the recorder is now loaded with the DVD 102, the switch 72a outputs the PES 81, supplied from the PES generating section 71a, to a video pack generating section 74a, which adds a pack header and a PES header to the pack data that has been obtained by dividing the picture data 81-2, thereby generating a video pack (V_PCK) of 2,048 bytes and outputting it to the multiplexing section 75. Portion (b) of FIG. 8 shows the data structure of a pack sequence. Two packs are shown in portion (b) of FIG. 8. Taking the first pack 82 as an example, the pack header 82-1, PES header 82-2 and pack data 82-3 are arranged in this order in the pack 82.

Meanwhile, the digital audio signal is also processed in a similar manner. Specifically, the audio encoder 70b subjects data contained in the digital audio signal to a compression and encoding process compliant with a predetermined standard, thereby generating audio data. Then, the audio data is sent to the PES generating section 71b. The PES generating section 71b adds a header to the audio data, thereby generating a PES packet. In accordance with the disk type information described above, the switch 72b outputs the PES, supplied from the PES generating section 71b, to an audio pack generating section 74b, which divides the audio PES and adds a pack header and a PES header, thereby generating an audio pack (A_PCK) of 2,048 bytes and outputting it to the multiplexing section 75.

The multiplexing section 75 receives the video packs and the audio packs, arranges them appropriately, and outputs a PS. Portion (c) of FIG. 8 shows the data structure of the PS 83 generated by the multiplexing section 75. It can be seen that the video and audio packs 82 and 84 are arranged as a mixture in the PS 83.

Referring back to FIG. 4, the drive control section 144 controls exchange of data with the optical disk drive and the HDD 106. The drive control section 144 may be a controller compliant with the ATA standard or the ATAPI standard, for example. In the optical disk drive and HDD 106, with which the drive control section 144 exchanges data, control circuits for controlling the respective drives are provided. Thus, the drive control section 144 actually exchanges data with those control circuits. It should be noted that the optical disk drive includes not only the control circuit but also a spindle motor for turning the DVD 102 or the BD 104 and an optical head (not shown) for radiating a semiconductor laser beam with an appropriate wavelength toward the DVD 102 or BD 104 to record a data stream thereon. The HDD 106 also includes a spindle motor for turning the hard disk and a magnetic head (none of which is shown).

The drive control section 144 gets information about the type of the optical disk inserted by the user from the DVD drive or the BD drive and conveys that information to the system control section 140. As a result, it can be seen whether the optical disk inserted is the BD 104 or the DVD 102. On top of that, if it is a DVD, then it can also be seen whether the DVD 102 inserted is a DVD-R or a DVD-RAM. Then, the system control section 140 can see whether or not the incoming stream needs to be subjected to a resolution conversion or a format conversion.

The control circuit of the DVD or BD drive may recognize the type of the given optical disk by any of various techniques. For example, disk type information, showing the type of an optical disk, may be recorded on the innermost area of the optical disk during the manufacturing process thereof and the control circuit of the drive may read the disk type information optically using the optical head (not shown). Also, when a laser beam is radiated toward an optical disk, the intensity of the light reflected from the optical disk changes with the type of the optical disk given as a storage medium. That is why the type of the given optical disk may also be recognized by making the control circuit detect the intensity of that reflected light. Furthermore, if an optical disk stored in a cartridge is inserted, then the control circuit may recognize the type of the given optical disk by the shape of the cartridge that changes according to the type of the storage medium. In any case, the disk type may be recognized by the optical or physical properties of the optical disk inserted.

The drive control section 144 receives the TS or PS and writes it on the built-in HDD 106 or the DVD 102 or BD 104 inserted. In this preferred embodiment, the drive control section 144 can write any of the TS and the PS on the HDD 106, the TS on the BD 104, and the PS on the DVD 102, respectively. However, depending on the type of the DVD 102 (such as a DVD-R or a DVD-RAM), the type of the PS that can be written on the DVD changes. In this case, the "type of the PS" is supposed to be one of the DVD Video standard and the DVD Video Recording standard that were defined as two major standards for program streams.

The system control section 140 is a CPU that performs overall control on the operation of the recorder 100. Specifically, the system control section 140 carries out its function by making the recorder 100 operate on the procedure to be described later with reference to FIGS. 9 through 12. The control operation performed by the system control section 140 is defined by a program that is stored in advance in a memory (not shown). The system control section 140 receives a user's command to record a program and outputs an instruction to select a channel on which the program in question will be broadcast. When carrying out a preset recording operation, the system control section 140 also outputs an instruction to select a channel on which the preselected program will be broadcast. Also, in fulfilling the request of preset recording, the system control section 140 receives a request to perform video recording and preset recording information from the video recording control section 142 (to be described below) and makes the digital signal processing section 110, encoder 138, drive control section 144 and so on carry out the video recording process in accordance with that request and preset recording information.

The video recording control section 142 is provided for the purpose of controlling the preset recording operation, and receives in advance the preset recording information about the details of the preset recording operation to carry out from the user and manages that information. Examples of the preset recording information include time information about the recording start and end times and channel information about the number of channel to select. When it is the recording start time specified by the time information, the video recording control section 142 requests the system control section 140 to carry out the recording operation and transmits the preset recording information. In response to this request, the system control section 140 instructs the stream extracting section 112 to select the channel and start receiving a TS. Thereafter, the system control section 140 gets the TS received continuously until the recording end time, when the system control section 140 instructs the stream extracting section 112 to stop receiving the TS. It should be noted that the time information and channel information are input through a hardware button or a remote controller (not shown) of the recorder 100 and transmitted to the video recording control section 142.

The memory card control section 146 controls exchange of data between a memory card that has been inserted into the recorder 100 and the recorder 100 itself. The memory card is a semiconductor storage medium and may be an SD memory card or a memory stick, for example, according to the standards. The memory card inserted into the recorder 100 is supposed herein to be an SD memory card 148.

In the preferred embodiment described above, the recorder 100 is supposed to include the digital signal receiving section 108*a*. However, the digital signal receiving section 108*a* may also be provided separately from the recorder 100 (e.g., within a settop box). In that case, the TS may be received by way of the IEEE 1394 I/F 108*b*.

Next, the analog signal processing system will be described. The analog signal processing section 120 receives an analog video signal and an analog audio signal, converts them into digital signals, and outputs the digital signals. The analog video signal and the analog audio signal may be terrestrial TV signals or signals received from an external device such as a VCR. The video represented by the analog video signal is supposed to be SD video.

The analog signal processing section 120 includes an analog signal receiving section 122, a video/audio switching circuit 124, a video A/D converter 126 and an audio A/D converter 128. The analog signal receiving section 122 may be an analog tuner, for example, and selectively outputs an analog video/audio signal of the selected channel from the terrestrial TV signal that has been received through an antenna (not shown). Also, the analog signal receiving section 122 may be a line input terminal, which receives an analog video/audio signal from an external device and outputs it. The analog video/audio signal includes a video signal in an analog format and an audio signal in an analog format. The video/audio switching circuit 124 splits the analog video/audio signal into an analog video signal and an analog audio signal and outputs them. The video A/D converter 126 converts the analog video signal into a digital video signal, while the audio A/D converter 128 converts the analog audio signal into a digital audio signal. The configurations and operations of the analog signal processing section 120, video A/D converter 126 and audio A/D converter 128 may be well-known ones and the description thereof will be omitted herein.

The digital video signal representing SD video is output from the video A/D converter 126 to the encoder 138 by way of the switch 134. On the other hand, the digital audio signal is output from the audio A/D converter 128 to the encoder 138 by way of the switch 136. The switches 134 and 136 switch the signal paths such that the SD video digital video signal supplied from the video A/D converter 126 and the digital audio signal supplied from the audio A/D converter 128 are both transmitted to the encoder 138. In response, the encoder 138 generates a data stream representing SD video from the digital video signal received. Also, the encoder 138 generates a PS when the recorder is loaded with the DVD 102 and generates a TS when the recorder is loaded with the BD 104. In this case, the same processing is carried out as when the digital video signal and digital audio signal are received from the resolution converting section 130 and the digital signal processing section 110, respectively, and the description thereof will be omitted herein.

Hereinafter, it will be described with reference to FIG. 9 how the recorder 100 operates. FIG. 9 shows the procedure of the processing to be done by the recorder 100 that has received a digital signal. First, in Step S91, the drive control section 144 recognizes the type of the loaded disk as a BD or a DVD and transmits disk type information to the system control section 140. Next, in Step S92, the stream extracting section 112 of the digital signal processing section 110 receives a TS and selects a channel requested.

Subsequently, in Step S93, the switch 114 receives the disk type information from the system control section 140 and determines whether the given disk is a DVD or not. If the answer is NO (i.e., if a BD has been inserted), then the process advances to Step S94. On the other hand, if the answer is YES (i.e., if a DVD has been inserted), then the process advances to Step S95. In Step S94, the TS on the selected channel is transmitted from the digital signal processing section 110 to the drive control section 144 by way of the switch 132 and is recorded on the BD 104 while maintaining the data structure of the TS. And when the recording operation is finished, the processing of the recorder 100 also ends.

In Step S95, the resolution converting section 130 receives the non-compressed digital video signal that has been decoded by the decoder 116 and determines whether the video represented by that signal is HD video or not. If the signal represents HD video, the process advances to Step S96. Otherwise (i.e., if the signal represents SD video), then the process jumps to Step S97. In the latter case, the resolution converting section 130 outputs the SD video as it is without processing it. In Step S96, the resolution converting section 130 converts the HD video into SD video. Then, the process advances to Step S97.

In Step S97, the encoder 138 generates a PS from the SD video digital video signal supplied from the resolution converting section 130 and the digital audio signal supplied from the digital signal processing section 110. The specific processing to be carried out in Step S97 will be described more fully later with reference to FIG. 10. Then, in Step S98, the drive control section 144 records the resultant PS on the DVD 102.

In the processing step S94 described above, the TS is recorded on the BD 104 as it is without determining whether the video included in the TS is HD video or SD video. However, if the video is HD video, the HD video may be converted into SD video and then the SD video may be recorded on the BD 104. In that case, the TS may be decoded once to convert the HD video into the SD video and then a TS may be generated again. If the latter TS is written on the BD 104, then its data size is much smaller than that of the former TS. As a result, more programs can be stored on the BD 104.

The process shown in FIG. 9 is carried out when a digital signal is received but is applicable in substantially the same way to a situation where an analog signal is received. In that case, however, not the TS but an analog video/audio signal is received in Step S92. In Step S94, a TS generated from the analog video/audio signal is recorded on the BD. And there is no need to carry out the processing steps S95 and S96.

Hereinafter, a PS generating process will be described in detail with reference to FIG. 10.

FIG. 10 shows the procedure of the PS generating process to be done by the recorder 100 of this preferred embodiment. According to this procedure, the PS generating process changes depending on whether the disk inserted is a DVD-R or a DVD-RAM (i.e., according to the type of the given DVD 102).

First, in Step S101, the encoder 138 determines whether or not the audio signal received includes multiple audio streams. As used herein, the "multiple audio streams" refer to respective audio streams representing original audio and dubbed audio for a bilingual telecast, for example. If the answer is YES, then the process advances to Step S102. Otherwise, the process advances to Step S103. It is necessary to determine whether or not there are multiple audio streams because the method of processing multiple audio streams changes depending on whether the given disk is a DVD-R or a DVD-RAM.

Next, in Step S102, the encoder 138 determines whether the DVD 102 on which the PS is going to be written is a DVD-R or a DVD-RAM. If it is a DVD-R, the process advances to Step S104. On the other hand, if it is a DVD-RAM, then the process advances to Step S105. This decision may be made on the basis of the disk type information, for example.

In Step S103, a part of the encoder 138, including the audio encoder 70b through the audio pack generating section 74b shown in FIG. 7, processes the digital audio signal of the audio stream, thereby generating audio packs. After that, the process advances to Step S106.

Meanwhile, in Step S104, the audio encoder 70b generates audio packs based on the digital audio signal of a single pre-selected audio stream. It is impossible to record a plurality of audio streams in parallel on a DVD-R. Besides, a number of independent audio streams cannot be multiplexed on a DVD-R within a single audio stream, either. For that reason, if the program to be recorded includes a plurality of audio options and if the disk inserted is a DVD-R, then an alert is supposed to pop up on the screen to prompt the user to select his or her desired audio option and the user is supposed to have already made his or her selection in response to that alert. In Step S104, only the audio stream selected in this manner is compressed and encoded and stored as PS audio data. After that, the process advances to Step S106.

On the other hand, in Step S105, the audio encoder 70b generates audio packs for a single audio stream based on the digital audio signals of a plurality of audio streams. As in a DVD-R, it is impossible to record a plurality of audio streams in parallel on a DVD-RAM, either. However, unlike a DVD-R, data representing a number of independent audio streams can be multiplexed on a DVD-RAM within a single audio stream. For example, the original audio may be recorded on channel L1 and the dubbed audio may be recorded on channel R1. Thus, the audio encoder 70b compresses and encodes the multiple incoming audio signals, thereby generating a single audio stream. After that, the process advances to Step S106.

In Step S106, the digital video signal representing the SD video is processed by the components, including the video encoder 70a through the video pack generating section 74a shown in FIG. 7, thereby generating video packs. And then the process advances to Step S107.

Finally, in Step S107, the multiplexing section 75 multiplexes the audio and video packs together and outputs them as a PS. By performing these processing steps, a PS can be generated in a format associated with the type of the DVD 102 for use as a storage medium.

Hereinafter, it will be described with reference to FIG. 11 how the recorder 100 performs a video recording operation on the HDD 106. FIG. 11 shows the procedure of the video recording operation to be done by the recorder 100 of this preferred embodiment. This video recording operation is characterized by not just merely recording a program on the HDD 106 but also making the recorded program ready to be dubbed onto the DVD 102 in the future.

In the following description, the disk as the target of the dubbing operation is supposed to be either a DVD-R or a DVD-RAM, not the BD 104. This is because when dubbing needs to be done from the HDD 106 onto the BD 104, no stream converting process needs to be carried out but the data may be transferred as it is. The process of recording video on the BD 104 and the process of recording video on the HDD 106 are essentially identical with each other. In either case, a TS is written while maintaining its data structure. That is why to make dubbing onto the BD 104, it should be enough to perform the processing steps S112 and S113 to be described later.

First, in Step S110, the system control section 140 receives an instruction on whether or not video should be recorded in a direct recording mode. This selection may be made by the user in response to an alert that has been popped up on a TV screen (not shown) by the system control section 140 during a recording mode setting, for example. If the user does not want to record the video in the direct recording mode, the process advances to Step S111. On the other hand, if the user does want to record it in the direct recording mode, then the process advances to Step S112.

In Step S111, the system control section 140 receives information specifying the type of the disk as the target of the dubbing operation. For example, if the user is going to use a DVD-R, then the user enters information designating a DVD-R. Then, in accordance with that information, the system control section 140 can know the type of the disk as the target of the dubbing operation. Alternatively, if an optical disk has already been inserted, then the system control section 140 may receive the disk type information from the drive control section 144 and recognize the type of disk inserted by that information.

Meanwhile, in Step S112, the digital signal receiving section 108a receives a TS 10 and the digital signal processing section 110 selects a channel requested. Next, in Step S113, the drive control section 144 records the TS 10 on the selected channel on the HDD 106 to end the process.

On the other hand, in Step S114, the digital signal receiving section 108a also receives the TS 10 and the digital signal processing section 110 also selects a channel requested. Then, in Step S115, the stream extracting section 112 determines whether the video extracted from the TS 10 is HD video or not. As described above, this decision can be made by the descriptor in the header of the stream. If the answer is YES, the process advances to Step S116. Otherwise, the process jumps to Step S117.

In Step S116, when the video stream of the TS 10 is decoded by the decoder 116, the resolution converting section 130 converts that HD video into SD video. Then the process advances to Step S117.

In Step S117, the system control section 140 determines whether the type of the target disk of the dubbing operation is a DVD-R or not. If the type of the target disk is a DVD-R, the process advances to Step S118. If it is a DVD-RAM, the process advances to Step S119.

In Step S118, the encoder 138 generates a PS for a DVD-R. As used herein, the "PS for a DVD-R" refers to a PS generated as a result of the processing steps S104, S106 and S107 shown in FIG. 10 if multiple audio streams are included in the TS.

Meanwhile, in Step S119, the encoder 138 generates a PS for a DVD-RAM. As used herein, the "PS for a DVD-RAM" refers to a PS generated as a result of the processing steps S105, S106 and S107 shown in FIG. 10 if multiple audio streams are included in the TS.

Finally, in Step S120, the drive control section 144 records the resultant PS on the HDD 106 to end the process.

According to this process, a PS that is ready to be written as it is on a DVD-R or a DVD-RAM is stored on the HDD 106. Thus, when the dubbing operation is carried out, there will be no need to perform a process that it takes a relatively long time to finish (e.g., a stream analysis) but the data of the PS will have only to be copied. As a result, high-speed dubbing is realized. In making a dubbing operation onto the BD 104, the data of the TS 10 stored on the HDD 106 just needs to be copied onto the BD 104 as it is (i.e., without changing its data structure at all) as described above.

Hereinafter, a dubbing operation, including these processing steps, will be described with reference to FIG. 12, which shows the procedure of the dubbing process to be done by the recorder 100 of this preferred embodiment.

First, in Step S121, the system control section 140 recognizes the type of the loaded disk by the disk type information provided by the drive control section 144. In this case, the disk type is BD, DVD-R or DVD-RAM.

Next, in Step S122, the system control section 140 determines whether the target disk is the DVD 102 or not. If the answer is NO (i.e., if it is the BD 104), the process advances to Step S123. If the answer is YES (i.e., if it is the DVD 102), the process advances to Step S124.

In Step S123, the drive control section 144 reads the TS 10 from the HDD 106 and records it on the BD 104.

Meanwhile, in Step S124, the system control section 140 further recognizes the type of the DVD 102 as either a DVD-R or a DVD-RAM and determines whether or not a PS associated with that type is present on the HDD 106. As used herein, the "PS associated with the type" means a PS for a DVD-R if the target disk is a DVD-R or a PS for a DVD-RAM if the target disk is a DVD-RAM. Each of these terms is just as defined for the processing steps S118 and S119 shown in FIG. 11. If there is a PS associated with the type of the DVD 102, the process advances to Step S125. Otherwise, the process advances to Step S126.

In Step S125, the drive control section 144 reads the associated PS from the HDD 106. Next, in Step S127, the drive control section 144 records that PS on the target disk (which may be a DVD-R or a DVD-RAM).

Meanwhile, in Step S126, the TS is read out from the HDD 106 and a PS is generated according to the type of the DVD. This processing step will be described in more detail. First, the drive control section 144 reads the TS from the HDD 106 and then sends the TS to the decoder 116 in the digital signal processing section 110. In response, the decoder 116 splits the TS into a video stream and an audio stream and then decodes these streams, thereby outputting a video signal and an audio signal. If the output video signal represents HD video, the resolution converting section 130 converts the HD video into SD video. On the other hand, if the output video signal represents SD video, then the resolution converting section 130 outputs the video signal representing the SD video as it is. Optionally, the resolution of the SD video may be converted into a different resolution if necessary within the resolution range defined for the SD video. Thereafter, the video signal representing the SD video and the audio signal are sent to the encoder 138. Then, the encoder 138 carries out the process shown in FIG. 10, thereby generating a PS associated with the type of the DVD. Finally, in Step S127, the drive control section 144 records that PS on the target disk (which is a DVD-R or a DVD-RAM). The dubbing process is completed by performing these processing steps.

The processing step S126 is similar to the conventional dubbing process. However, the recorder 100 of this preferred embodiment combines this processing step S126 with other unique processing steps (such as Steps S124, S125 and S127), thereby complementing the conventional dubbing process.

As described above, in the dubbing process carried out either in Step S123 or through Steps S124, S125 and S127, there is no need to perform the process of analyzing the data of the PS or TS, the process of converting the video quality and so on. Thus, compared to the situation where those processes need to be done, the dubbing process can be finished in a much shorter time.

A known device that can perform digital recording on a DVD usually includes not only a signal processor, which carries out substantially the same processing as the analog signal processing section 120 described above, but also an encoder that receives a digital signal from that circuit and converts it into a PS. For that reason, the increase in cost caused by providing the analog signal processing section 120 and encoder 138 usually does not pose a big problem. In this preferred embodiment, the encoder 138 provided for that purpose is used to generate a PS to be recorded on a DVD when a TS is received. Even when the TS needs to be converted into a PS, the encoder 138 performs the same processing because the output of the digital signal processing section 110 has already been decompressed. That is why just the resolution converting section 130 and switches 134 and 136 need to be added. According to this preferred embodiment, when a TS is received, the video may have its resolution converted if necessary and then may be recorded directly on a DVD. Thus, the conventional encoder 138 can be used effectively and the handiness can be increased for the users.

It should be noted that the video stored on the DVD 102 is always SD grade. Thus, the recorder 100 may store resolution information, indicating whether the broadcast video is SD video or HD video, in a PS and then record the PS on the DVD 102. For example, if the HD video has been converted into the SD video, then a value showing that the video used to be HD video before the conversion may be described. On the other hand, if the SD video remains the same, then a value showing that the video has always been SD video may be described. And when that program is played back, the user is informed of the grade of the broadcast video by means of its resolution information. As a result, the user can know whether the program was broadcast as SD video or HD video. If it was broadcast as HD video, then the user can recognize the source of the HD video and can know that the video may be separately available as HD video. This method is particularly effectively applicable to a preset recorded program. In recording a PS compliant with the DVD Video Recording standard, for example, the information showing whether the broadcast video was SD video or HD video may be described in the manufacturer's information field of an RDI pack compliant with that standard. The "manufacturer's information field" is a data field in which arbitrary information defined in advance by the manufacturer of the recorder 100 can be described as attribute information and is known to those skilled in the art.

The processing involving format conversion has been described by way of various examples. The format conversion is also called "transcoding" and may be carried out in various modes, which may be roughly classifiable into the categories of:

(1) Stream format conversion;
(2) Coding format conversion;
(3) Resolution/frame rate conversion; and
(4) Bit rate conversion.

Hereinafter, it will be described which of these four categories the conversion process of this preferred embodiment belongs to, along with other examples belonging to the other categories.

The stream format conversion (Category (1)) is carried out mainly by the encoder 138. The conversion in this category includes not only a conversion of a TS into a PS as described for the preferred embodiment of the present invention but also a conversion of a PS compliant with the DVD Video standard into a PS compliant with the DVD Video Recording standard. Each of these conversions is realized by adapting the encoder 138 to that specific conversion. For example, the encoder 138 may be implemented either as a dedicated chip circuit or by making a general-purpose microcomputer execute a dedicated processing program.

The coding format conversion (Category (2)) is also carried out mainly by the encoder 138. Examples of conversions belonging to this category include a stream conversion between the MPEG-2 standard and the MPEG-4 standard, a stream conversion between the Windows® Media Video 9 standard and the MPEG-4 standard, and a stream conversion from the MPEG-2 standard into the MPEG-4 AVC standard. Each of these conversions may be carried out bidirectionally.

The resolution/frame rate conversion (Category (3)) is carried out mainly by the resolution converting section 130. Examples of resolution conversions belonging to this category include a conversion of HD video into SD video as described for the preferred embodiment of the present invention, a resolution conversion between the D1 standard and the QCIF standard, and a resolution conversion between the VGA standard and the QVGA standard. The frame rate conversion may be a conversion of 30 frames per second into 15 frames per second, for example.

The bit rate conversion (Category (4)) is carried out mainly by the encoder 138. The conversion belonging to this category may be a conversion of 8 megabits per second into 2 megabits per second, for example.

The various standards mentioned in these categories (1) through (4) are well known in the art and their data structures are known to those skilled in the art. Thus, detailed description thereof will be omitted herein. Also, a conversion process between two standards may be realized by decoding a given stream and converting it into a digital baseband signal once and then encoding the signal in a format compliant with the standard in question. It should be noted that if the coding methods are the same, for example, the data stream sometimes does not have to be decoded into a digital baseband signal. For example, in converting a PS compliant with the DVD Video standard into a PS compliant with the DVD Video Recording standard, the data in the video and audio elementary streams are the same between the two PS and can be used as it is without decoding that data. Thus, just by describing a pack header or converting a control pack (e.g., from a navi pack into an RDI pack), the stream conversion can be done without debasing the video/audio quality.

The format conversions in these categories (1) through (4) may be carried out either by themselves or in combination. Thus, an exemplary combination has been mentioned in the preferred embodiment of the present invention described above. Another combination may be the process of converting an MPEG2-TS (HD video) stored on the HDD 106 to watch it on a TV set into an MPEG-4 compliant stream (SD video) to watch on a cell phone. In this example, the conversion of the MPEG2-TS into the MPEG-4 compliant stream belongs to Category (2) and the resolution conversion of HD video into SD video belongs to Category (3). The MPEG-4 compliant stream generated as a result of the conversion process may be transmitted to the memory card control section 146 of the recorder 100 and is written by the memory card control section 146 on the SD memory card 148 that has been inserted into the recorder 100. Then, the SD memory card 148 is removed from the recorder 100 and is inserted into the cell phone. When the MPEG-4 compliant stream is decoded by the cell phone, video and audio can be watched and listened to. In generating an MPEG-4 compliant stream, processes belonging to Categories (3) and (4) may be further performed from the standpoint of data size available. For example, it is practical to convert the frame rate from 30 frames per second into 15 frames per second. In addition, since the display of a cell phone is smaller than that of a TV set, it is also practical to convert the bit rate from 8 megabits per second into 768 kilobits per second.

In the preferred embodiment described above, the video and audio switches 134 and 136 are supposed to receive a digital video signal from the digital signal processing section 110 and a digital audio signal from the analog signal processing section 120, respectively. However, the video and audio switches 134 and 136 may receive those signals from other processing sections and output them to the encoder 138. For example, the recorder 100 may be further provided with another interface compliant with the DV standard and a processing section (DV codec) that can process a DV compliant stream and may be designed such that the video and audio switches 134 and 136 receive a digital video signal and a digital audio signal obtained by converting the DV compliant stream.

INDUSTRIAL APPLICABILITY

The present invention provides a data processor that can record a received data stream directly on an inserted (i.e., removable) storage medium without temporarily storing it elsewhere. No matter whether the received data stream represents high resolution video or standard resolution video, this data processor can record the data stream directly on a storage medium. Thus, compared to the situation where data is temporarily stored somewhere, subjected to a predetermined conversion and then dubbed elsewhere, the device can save the temporary data storage space and the user can save the time and trouble for re-conversion and re-recording.

Optionally, to make the data processor carry out every preset recording operation just as the user wishes even if he or she has preset the video recording operation but failed to insert a required storage medium, data may be temporarily stored and then subjected to the additional re-conversion and re-recording processes. Then, the handiness of this data processor can be further increased.

The invention claimed is:

1. A data processor that is loadable with a first type of storage medium and a second type of storage medium and that records a data stream on a storage medium loaded,
    a data stream representing video of standard resolution being recordable in a first format on the first type of storage medium, a data stream representing video of either the standard resolution or a resolution higher than the standard resolution being recordable in a second format on the second type of storage medium,
    the data processor comprising:
    a drive, which is loaded with a storage medium, for recognizing the type of the storage medium loaded;
    a processing section for receiving a data stream in the second format, for extracting a video data stream from the data stream, and for detecting a resolution of the video;
    a switch for sending a data stream, resulting from the data stream in the second format, along a first path if the first type of storage medium is loaded and if the video is of the higher resolution, and for sending the data stream in the second format along a second path if the second type of storage medium is loaded and if the video is of the standard resolution;
    a converting section for converting the resolution of the video of the data stream, received by way of the first path, into the standard resolution; and
    an encoder for generating a data stream in the first format from the data stream of which the resolution has been converted into the standard resolution,
    wherein the drive writes the data stream supplied from the encoder and the data stream received by way of the second path on the storage medium loaded.

2. The data processor of claim 1, further comprising an analog signal processing section for receiving an analog signal representing video and for generating a data stream representing video of the standard resolution,
    wherein the encoder generates a data stream in the first format from the data stream that has been generated by the analog signal processing section.

3. The data processor of claim 1, further comprising a control section for receiving in advance, and managing, time information about recording start and end times,
    wherein the control section instructs the processing section to start and stop receiving the data stream in the second format in accordance with the time information.

4. The data processor of claim 1, wherein the converting section adds resolution information about original resolution before the conversion to the data stream that has been converted into the video of the standard resolution, and
    wherein the encoder generates the data stream in the first format including the resolution information.

5. The data processor of claim 1, wherein if the second type of storage medium is loaded and if the video has the higher resolution, the switch sends the data stream in the second format along the second path.

6. The data processor of claim 1, wherein if the second type of storage medium is loaded and if the video has the higher resolution, the switch sends a data stream, resulting from the data stream in the second format, along the first path, and
    wherein the encoder generates the data stream in the second format from the data stream, of which the resolution has been converted into the standard resolution by the converting section.

* * * * *